(12) United States Patent
Suzuki et al.

(10) Patent No.: US 10,141,878 B2
(45) Date of Patent: Nov. 27, 2018

(54) CONTROLLER FOR PERMANENT MAGNET SYNCHRONOUS MOTOR, AND CONTROL METHOD FOR ESTIMATING INITIAL POSITION OF ROTOR

(71) Applicant: KONICA MINOLTA, INC., Chiyoda-ku, Tokyo (JP)

(72) Inventors: Daichi Suzuki, Toyokawa (JP); Yuta Tachibana, Toyokawa (JP); Hiroyuki Yoshikawa, Toyohashi (JP); Yasuhiro Koide, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/813,690

(22) Filed: Nov. 15, 2017

(65) Prior Publication Data

US 2018/0167009 A1    Jun. 14, 2018

(30) Foreign Application Priority Data

Dec. 8, 2016    (JP) .................................. 2016-238177

(51) Int. Cl.
| | |
|---|---|
| H02P 1/46 | (2006.01) |
| H02P 3/18 | (2006.01) |
| H02P 6/00 | (2016.01) |
| H02P 21/18 | (2016.01) |
| H02P 6/18 | (2016.01) |
| H02P 6/17 | (2016.01) |
| H02P 21/34 | (2016.01) |
| H02P 6/185 | (2016.01) |

(52) U.S. Cl.
CPC ................ *H02P 21/18* (2016.02); *H02P 6/17* (2016.02); *H02P 6/185* (2013.01); *H02P 6/186* (2013.01); *H02P 21/34* (2016.02)

(58) Field of Classification Search
CPC .................................... H02P 21/18; H02P 6/17
USPC .......................................................... 318/701
See application file for complete search history.

(56) References Cited

U.S. PATENT DOCUMENTS

| | | | | |
|---|---|---|---|---|
| 8,884,575 B2* | 11/2014 | Takahata | ................. | H02P 6/182 318/700 |
| 8,970,146 B2* | 3/2015 | Pollock | ..................... | H02P 6/18 318/400.01 |
| 9,077,775 B2* | 7/2015 | Srikrishna | ......... | G06F 17/30867 |
| 9,093,940 B2* | 7/2015 | Xu | .......................... | H02P 6/183 |

FOREIGN PATENT DOCUMENTS

JP            63069489 A        3/1988

* cited by examiner

*Primary Examiner* — Erick Glass
(74) *Attorney, Agent, or Firm* — Holtz, Holtz & Volek PC

(57) ABSTRACT

A controller for a sensorless permanent magnet synchronous motor having a rotor using a permanent magnet, the rotor rotating by a rotating magnetic field caused by a current flowing through an armature is provided. The controller is configured to apply a pulse voltage for generating a magnetic field vector for searching for the initial position to each of search sections obtained by dividing a target range, narrow down a target range in such a manner that a search section in which a largest amount of current flows through the armature by application of the pulse voltage is selected as a subsequent target range, and repeat the application processing and the narrow-down processing to estimate the initial position.

11 Claims, 23 Drawing Sheets

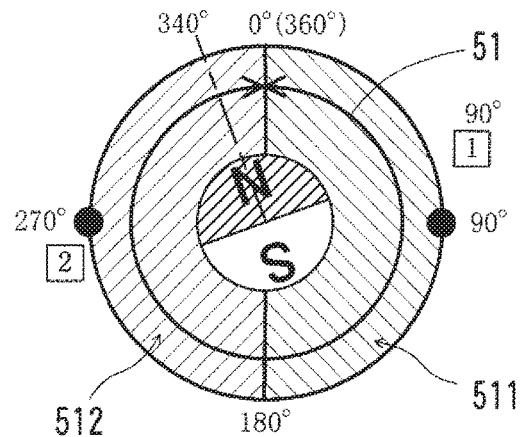
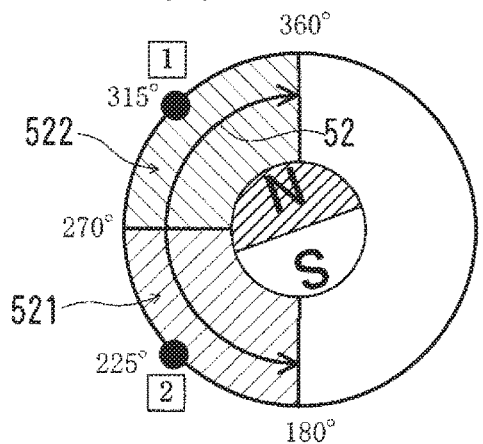
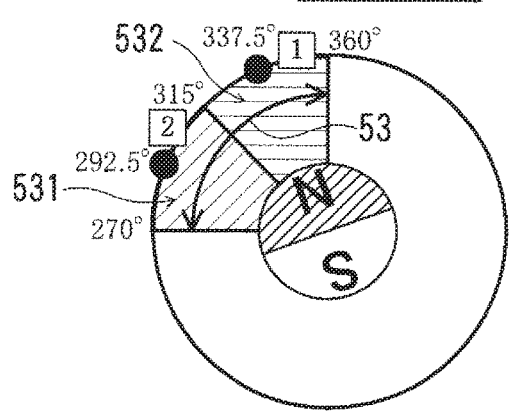
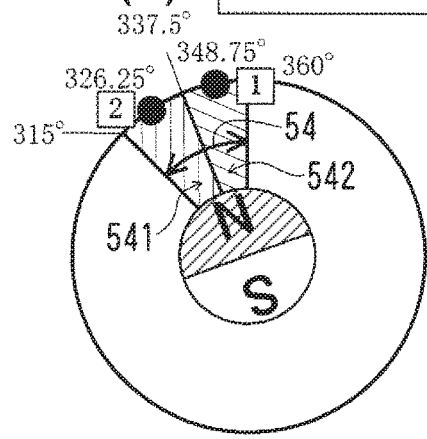

FIG. 10(A) FIRST STEP (FIRST TIME)
FIG. 10(B) FIRST STEP (SECOND TIME)
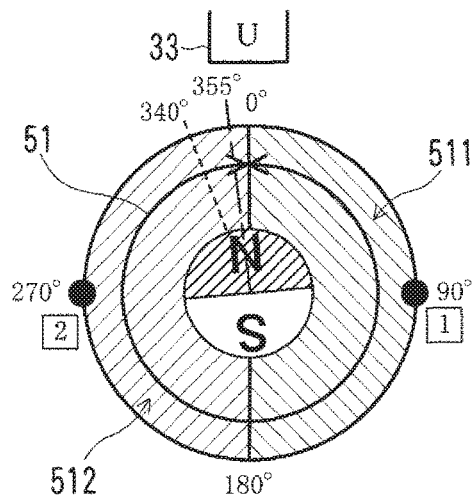
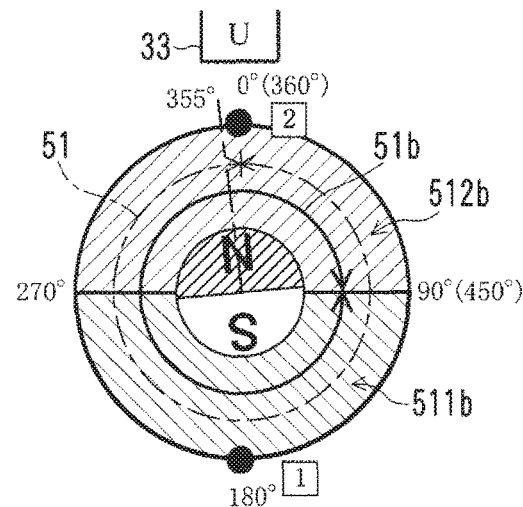
FIG. 10(C)
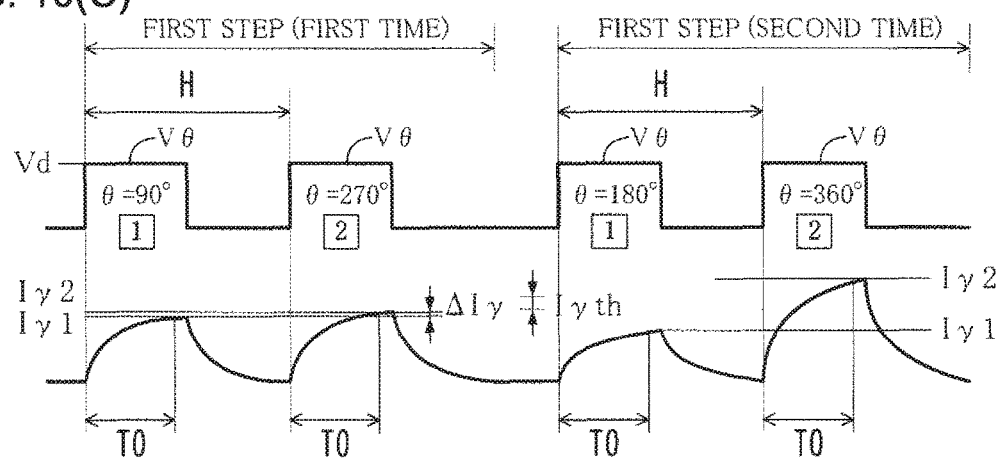

FIG. 12

| | NARROW-DOWN STEP | TARGET RANGE (DEGREE) | APPLICATION ORDER | θ (DEGREE) |
|---|---|---|---|---|
| 80 { 81 { | FIRST STEP | 0-360 | 1 | 90 |
| | | | 2 | 270 |
| | SECOND STEP | 0-180 | 1 | 45 |
| | | | 2 | 135 |
| | | 180-360 | 1 | 315 |
| | | | 2 | 225 |
| | THIRD STEP | 0-90 | 1 | 22.5 |
| | | | 2 | 67.5 |
| | | 90-180 | 1 | 112.5 |
| | | | 2 | 157.5 |
| | | 180-270 | 1 | 202.5 |
| | | | 2 | 247.5 |
| | | 270-360 | 1 | 337.5 |
| | | | 2 | 292.5 |
| | FOURTH STEP | 0-45 | 1 | 11.25 |
| | | | 2 | 33.75 |
| | | 45-90 | 1 | 56.25 |
| | | | 2 | 67.25 |
| | | 90-135 | 1 | 123.75 |
| | | | 2 | 101.25 |
| | | 135-180 | 1 | 168.75 |
| | | | 2 | 146.25 |
| | | 180-225 | 1 | 191.25 |
| | | | 2 | 213.75 |
| | | 225-270 | 1 | 236.25 |
| | | | 2 | 258.75 |
| | | 270-315 | 1 | 303.75 |
| | | | 2 | 281.25 |
| | | 315-360 | 1 | 348.75 |
| | | | 2 | 326.25 |
| | NARROW-DOWN STEP | TARGET RANGE (DEGREE) | APPLICATION ORDER | θ (DEGREE) |
| 81b { | FIRST STEP | 90-450 | 1 | 180 |
| | | | 2 | 360(0) |
| | SECOND STEP | 90-270 | 1 | 135 |
| | | | 2 | 225 |
| | | 270-450 | 1 | 45 |

FIG. 14(A) FIRST STEP
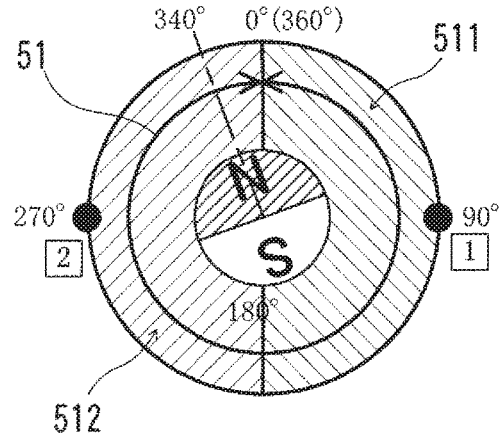
FIG. 14(B) SECOND STEP
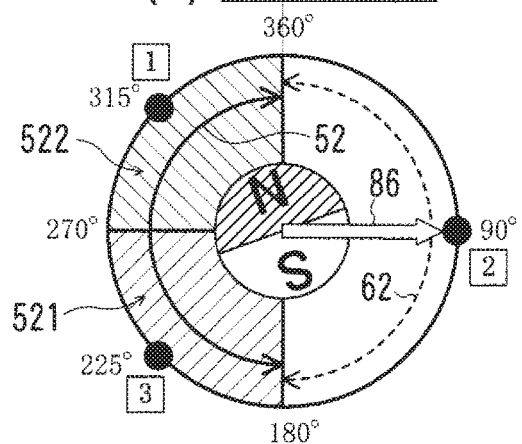
FIG. 14(C) THIRD STEP
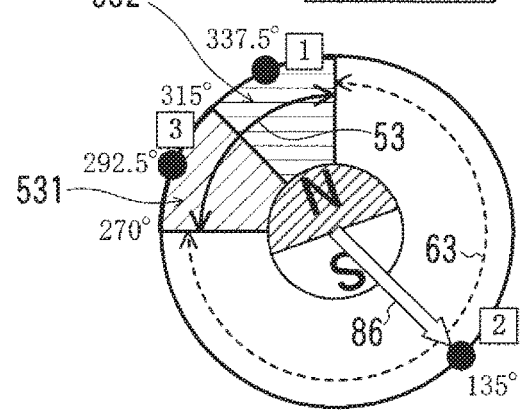
FIG. 14(D) FOURTH STEP
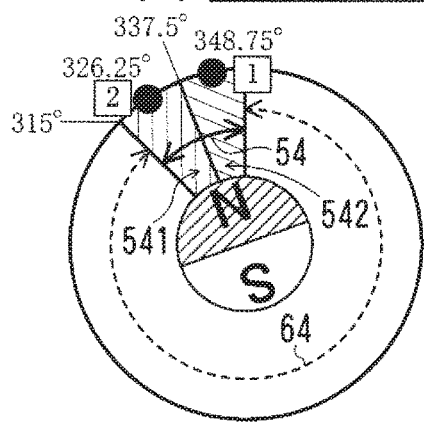

FIG. 16

| NARROW-DOWN STEP | TARGET RANGE (DEGREE) | APPLICATION ORDER | θ (DEGREE) |
|---|---|---|---|
| FIRST STEP | 0-360 | 1 | 90 |
| | | 2 | 270 |
| SECOND STEP | 0-180 | 1 | 45 |
| | | 2 | 270 |
| | | 3 | 135 |
| | 180-360 | 1 | 315 |
| | | 2 | 90 |
| | | 3 | 225 |
| THIRD STEP | 0-90 | 1 | 22.5 |
| | | 2 | 225 |
| | | 3 | 67.5 |
| | 90-180 | 1 | 112.5 |
| | | 2 | 315 |
| | | 3 | 157.5 |
| | 180-270 | 1 | 202.5 |
| | | 2 | 45 |
| | | 3 | 247.5 |
| | 270-360 | 1 | 337.5 |
| | | 2 | 135 |
| | | 3 | 292.5 |
| FOURTH STEP | 0-45 | 1 | 11.25 |
| | | 2 | 33.75 |
| | 45-90 | 1 | 56.25 |
| | | 2 | 67.25 |
| | 90-135 | 1 | 123.75 |
| | | 2 | 101.25 |
| | 135-180 | 1 | 168.75 |
| | | 2 | 146.25 |
| | 180-225 | 1 | 191.25 |
| | | 2 | 213.75 |
| | 225-270 | 1 | 236.25 |
| | | 2 | 258.75 |
| | 270-315 | 1 | 303.75 |
| | | 2 | 281.25 |
| | 315-360 | 1 | 348.75 |
| | | 2 | 326.25 |

| NARROW-DOWN STEP | TARGET RANGE (DEGREE) | APPLICATION ORDER | θ (DEGREE) |
|---|---|---|---|
| FIRST STEP | 90-450 | 1 | 180 |
| | | 2 | 360(0) |
| SECOND STEP | 90-270 | 1 | 135 |
| | | 2 | 0 |
| | | 3 | 225 |

FIG. 19

| THE NUMBER OF PULSES M | DIVISION NUMBER N (ANGLE OF FINAL TARGET RANGE [DEGREE]) | | | | | | | FORMULA REPRESENTING THE NUMBER OF PULSES | |
|---|---|---|---|---|---|---|---|---|---|
| | 2 (180) | 4 (90) | 8 (45) | 16 (22.5) | 32 (11.3) | 64 (5.6) | 128 (2.8) | $f(N)$ | ORDER $O(N)$ |
| FULL SEARCH | 2 | 4 | 8 | 16 | 32 | 64 | 128 | $N$ | $N$ |
| BINARY SEARCH (NO ROTATION PREVENTION) | 2 | 4 | 6 | 8 | 10 | 12 | 14 | $2\log_2 N$ | $\log_2 N$ |
| BINARY SEARCH (ROTATION PREVENTION APPLIED) | 2 | 5 | 8 | 11 | 14 | 17 | 20 | $3\log_2 N - 1$ | $\log_2 N$ |

CONTROLLER FOR PERMANENT MAGNET SYNCHRONOUS MOTOR, AND CONTROL METHOD FOR ESTIMATING INITIAL POSITION OF ROTOR

The entire disclosure of Japanese Patent application No. 2016-238177, filed on Dec. 8, 2016, is incorporated herein by reference in its entirety.

BACKGROUND

1. Technological Field

The present invention relates to a controller for permanent: magnet synchronous motor and a control method for estimating an initial position of a rotor.

2. Description of the Related. Art

Permanent Magnet Synchronous Motors (PMSM) generally have a stator with windings (armature winding) and a rotor using a permanent magnet. In such permanent magnet synchronous motors, an alternating current is applied to the windings to cause a rotating magnetic field, which rotates the rotor synchronously therewith.

Recent years have seen the widespread use of sensorless permanent magnet synchronous motors. Such a sensorless permanent magnet synchronous motor has no encoder and no magnetic sensor for detecting a position of magnetic poles. For this reason, in order to drive such a sensorless permanent magnet synchronous motor, a method is used in which a position of magnetic poles of a rotor and a rotational speed thereof are estimated based on a current flow induced by an induction voltage generated in windings during rotation of the rotor.

There has been employed a method called "inductive sensing" as a technique for so-called initial position estimation for estimating a position of magnetic poles of a rotor while a sensorless permanent magnet synchronous motor stops. In the method, a property that the inductance of windings slightly changes depending on the position of magnetic poles is used. As described in Japanese Laid-open. Patent Publication No. 63-069489, a voltage is applied to the windings so that the individual phases are excited in order, and a position of magnetic poles is estimated by comparing peak amplitude values of currents flowing through the windings in excitation of the individual phases.

The initial position estimation is performed, so that a stator can be excited properly depending on a position of the magnetic poles of the rotor when the rotor is started to rotate after the estimation.

In the initial position estimation by the inductive sensing, an angular position range of 360 degrees ($2\pi$) by an electrical angle is divided into a plurality of sections, and a voltage is applied to the windings in such a manner that a magnetic field is generated in each of the sections. The voltage is applied a plurality of times at intervals and a current flowing through the windings is measured for each of the voltage applications. The position of magnetic poles is estimated based on the result of the measurements. For example, a position of a section having the largest current value is estimated to be the position of magnetic poles.

In order to increase the accuracy of estimation, it is necessary to finely divide the angular position range into small sections. The finely division into small sections, however, causes a problem that the number of times of voltage application is increased and longer time is required for estimation.

SUMMARY

The present invention has been achieved in light of such a problem, la and therefore, an object of an embodiment of the present invention is to provide a controller capable of estimating a position of magnetic poles of a stopped rotor with a predetermined degree of accuracy and of shortening the time necessary for the estimation and to provide a control method for estimating an initial position.

To achieve at least one of the abovementioned objects, according to an aspect of the present invention, a controller reflecting one aspect of the present invention is a controller for a sensorless permanent magnet synchronous motor having a rotor using a permanent magnet, the rotor rotating by a rotating magnetic field caused by a current flowing through an armature, the controller including: a drive portion configured to apply a voltage to the armature to drive the rotor; an initial position estimating portion configured to estimate an initial position which is a position of magnetic poles of the rotor which is in a stop state; and a control unit configured to control the drive portion; wherein the initial position estimating portion gives instructions to the control unit to apply a pulse voltage for generating a magnetic field vector for searching for the initial position to each of search sections obtained by dividing a target range, narrows down a target range in such a manner that a search section in which a largest amount of current flows through the armature by application of the pulse voltage is selected as a subsequent target range, and estimates the initial position.

To achieve at least one of the abovementioned objects, according to another aspect of the present invention, a control method reflecting another aspect of the present invention is a control method for estimating an initial position of a rotor in a sensorless permanent magnet synchronous motor, the control method including estimating an initial position by repeatedly performing processing for applying a pulse voltage for generating a magnetic field vector for searching for the initial position to each of search sections obtained by dividing a target range which is an angular position range to be searched in an armature and processing for narrowing down a target range in such a manner that a search section in which a largest amount of current flows through the armature by application of the pulse voltage is selected as a subsequent target range.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIGS. 8(A)-8(D) are diagrams showing an outline of a first example of initial position estimation by using a binary search.

FIGS. 10(A)-10(C) are diagrams showing an example of a change in angular position of a target range for the case where a search is impossible.

FIG. 12 is a diagram showing an example of a table in which to set a direction of a magnetic field vector.

FIGS. 14(A)-14(D) are diagrams showing an outline of a second example of initial position estimation by using a binary search.

FIG. 16 is a diagram showing an example of a table in which to set a direction of a magnetic field vector.

FIG. 19 is a diagram showing an example of the relationship between a division number of a target range and the number of application times of a pulse voltage.

DETAILED DESCRIPTION OF THE EMBODIMENTS

Hereinafter, one or more embodiments of the present invention will be described with reference to the drawings. However, the scope of the invention is not limited to the disclosed embodiments.

Figure 1:
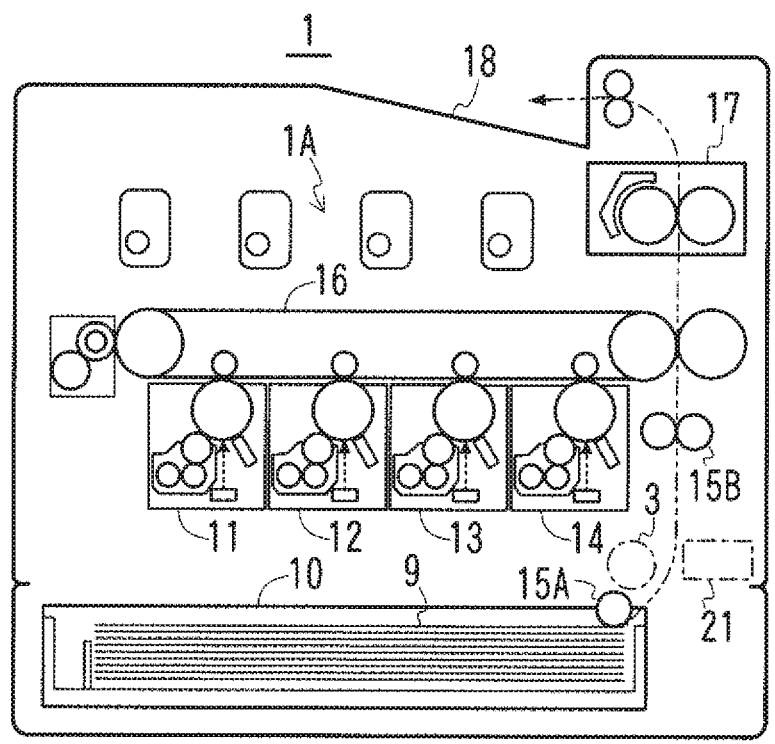
FIG. 1 is a diagram showing an outline of the structure of an image forming apparatus having a motor controller according to an embodiment of the present invention.
Figure 2A:
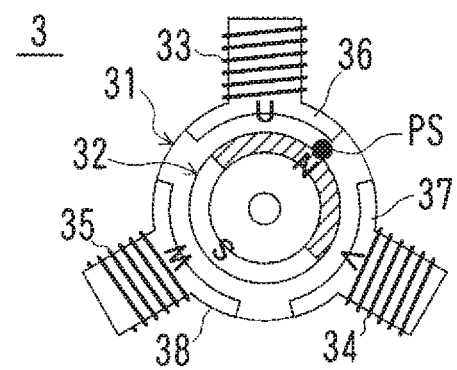
FIGS. 2A and 2B are diagrams each schematically showing an example of the structure of a brushless motor.
Figure 2B:
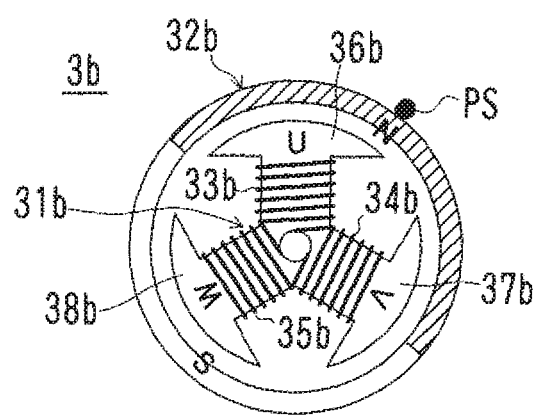

FIG. 1 shows an example of an outline of the structure of an image forming apparatus 1 having a motor controller 21 according to an embodiment of the present invention. FIGS. 2A and 2B schematically show examples of the structure of brushless motors 3 and 3b, respectively.

Referring to FIG. 1, the image forming apparatus 1 is a color printer provided with an electrophotographic printer engine 1A. The printer engine 1A has four imaging stations 11, 12, 13, 14 to form, in parallel, a toner image of four colors of yellow (Y), magenta (M), cyan (C), and black (K). Each of the imaging stations 11, 12, 13, and 14 has a tubular photoconductor, an electrostatic charger, a developing unit, a cleaner, a light source for exposure, and so on.

The toner image of four colors is primarily transferred to the intermediate transfer belt 16, and then secondarily transferred onto paper 9 which has been sent out from a paper cassette 10 by a paper feed roller 15A, has passed through registration rollers 15E, and has been conveyed. After the secondary transfer, the paper 9 passes through a fixing unit 17 and then to be delivered to a paper output tray 18 which is provided in an upper part of the image forming apparatus 1. While the paper 9 passes through the fixing unit 17, the toner image is fixed onto the paper 9 by application of heat and pressure.

The image forming apparatus 1 uses a plurality of brushless motors including the brushless motor 3 as drive sources to rotate rotating members such as the fixing unit 17, the intermediate transfer belt 16, the paper feed roller 15A, the registration rollers 15B, the photoconductor, and a roller for the developing unit. Stated differently, the printer engine 1A uses the rotating members of which rotation is driven by the brushless motors to feed the paper 9 and to form an image onto the paper 9.

The brushless motor 3 is disposed, for example, in the vicinity of the paper cassette 10 to drive the rotation of the paper feed roller 15A. The brushless motor 3 is controlled by the motor controller 21.

Referring to FIGS. 2A and 2B, the brushless motors 3 and 3b are sensorless Permanent Magnet Synchronous Motors (PMSM).

The brushless motor 3 shown in FIG. 2A has a stator 31 acting as an armature for causing a rotating magnetic field and an inner rotor 32 using a permanent magnet. The stator 31 has a U-phase core 36, a V-phase core 37, and a W-phase core 38 that are located at 120°, by electrical angle, intervals from one another and three windings (coils) 33, 34, and 35 that are provided in the form of Y-connection. A 3-phase alternating current of U-phase, V-phase, and W-phase is fed to the windings 33-35 to excite the cores 36, 37, and 38 in turn, so that a rotating magnetic field is caused. The rotor 32 rotates in synchronism with the rotating magnetic field.

Instead of the brushless motor 3 described above, the brushless motor 3b shown in FIG. 2B may be mounted with the image forming apparatus 1. The brushless motor 3b has a stator 31b for causing a rotating magnetic field and an outer rotor 32b using a permanent magnet. The stator 31b has a U-phase core 38b, a V-phase core 37b, and a W-phase core 38b that are located at 120°, by electrical angle, intervals from one another and three windings (coils) 33b, 34b, and 35b that are provided in the form of Y-connection. As with the brushless motor 3, the brushless motor 3b rotates in synchronism with the rotating magnetic field.

In the examples shown in FIGS. 2A and 2B, the number of magnetic poles of each of the rotors 32 and 32b is two. However, the number of magnetic poles of each of the rotors 32 and 32b is not limited to two, may be four, or more than six. The number of slots of each of the stators 31 and 31b is not limited to three. In any case, the motor controller 21 performs, on the brushless motors 3 and 3b, a vector control (sensorless vector control) for estimating a position of magnetic poles and a rotational speed by using a control model based on a d-q coordinate system.

It is noted that, in the following description, of an S-pole (south pole) and an N-pole (north pole) of the rotor 32, a rotational angular position of the N-pole shown by a filled circle is sometimes referred to as a "position of magnetic pole PS" of the rotor 32. The direction from the center of rotation of the rotor 32 toward the position of magnetic pole PS is sometimes referred to as a "direction of magnetic pole".

Figure 3:
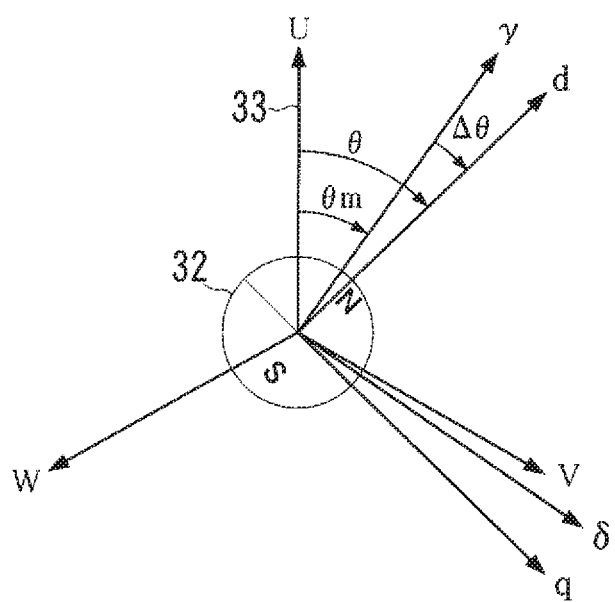
FIG. 3 is a diagram showing an example of a d-q axis model of a brushless motor.

FIG. 3 shows an example of a d-q axis model of the brushless motor 3. The vector control on the brushless motor 3 is simplified by converting the 3-phase alternating current flowing through the windings 33-35 of the brushless motor 3 to a direct current fed to a 2-phase winding which rotates in synchronism with a permanent magnet acting as the rotor 32.

Let the direction of magnetic flux (direction of the N-pole) of the permanent magnet be a d-axis. Let the direction of movement from the d-axis by an electrical angle of $\pi/2$ [rad] (90°) be a q-axis. The d-axis and the q-axis are model axes. The U-phase winding 33 is used as a reference and a movement angle, of the d-axis with respect to the reference is defined as an angle θ. The angle θ represents an angular position (position PS) of a magnetic pole with respect to the U-phase winding 33. The d-q coordinate system is at a position moved, by angle θ, from the reference, namely, the U-phase winding 33.

Since the brushless motor 3 is provided with no position sensor to detect an angular position (position of magnetic pole) of the rotor 32, the motor controller 21 needs to estimate a position PS of the magnetic poles of the rotor 32. A γ-axis is defined corresponding to an estimated angle θm which represents the estimated position of the magnetic pole. A δ-axis is defined as a position moved, by an electrical angle of $\pi/2$, from the γ-axis. The γ-δ coordinate system is positioned moved, by estimated angle θm, from the reference, namely, the U-phase winding 33. A delay of the estimated angle θm with respect to the angle θ is defined as an angle Δθ. When the amount of delay Δθ is 0 (zero), the γ-δ coordinate system coincides with the d-q coordinate system.

Figure 4:
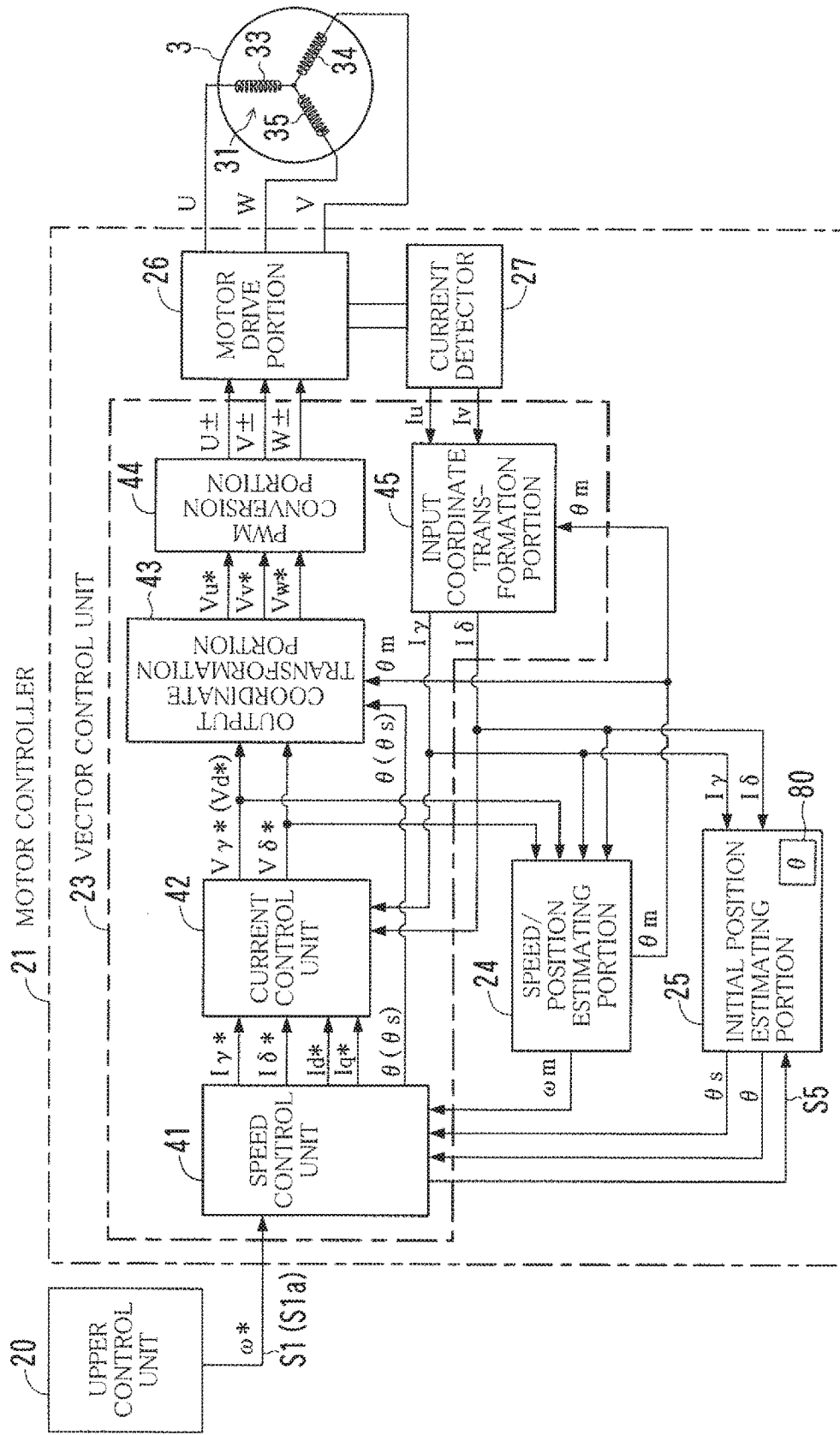
FIG. 4 is a diagram showing an example of the functional configuration of a motor controller.
Figure 5:
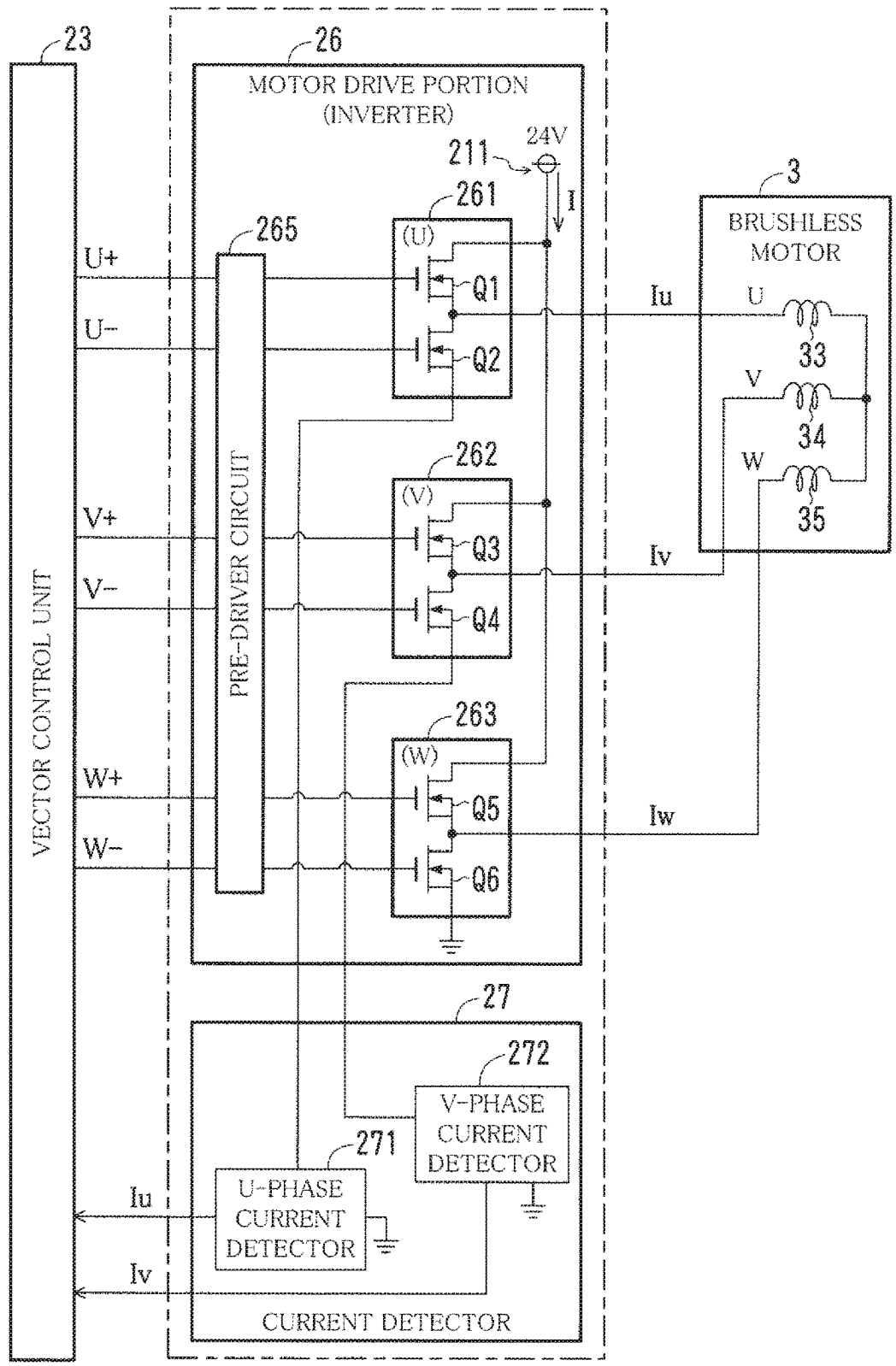
FIG. 5 is a diagram showing an example of the configuration of a motes drive portion and a current detector of a motor controller.
Figure 6A:
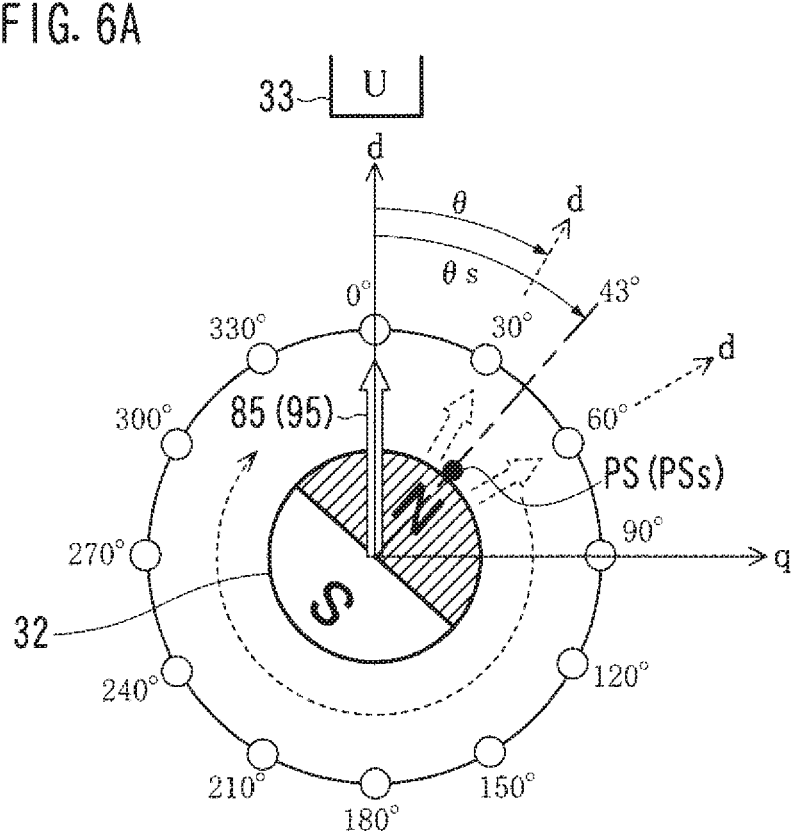
FIGS. 6A and 6B are diagrams showing an outline of the processing of initial position estimation by using a full search.
Figure 6B:
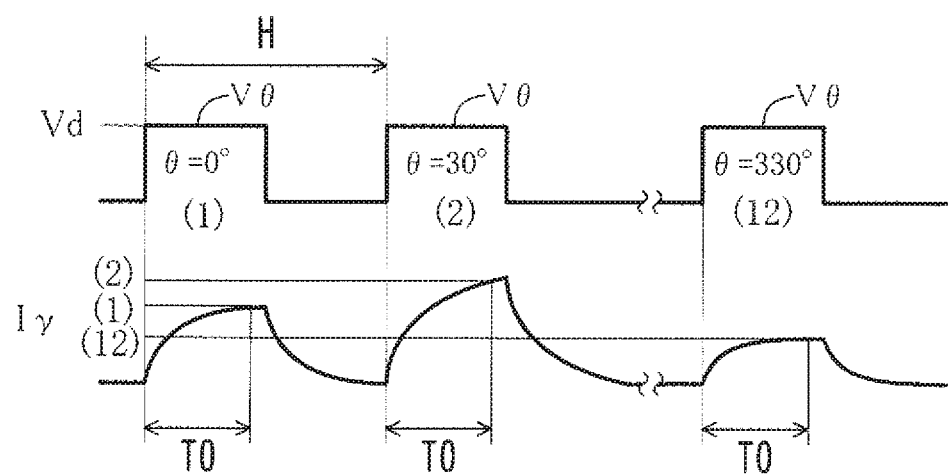
Figure 7:
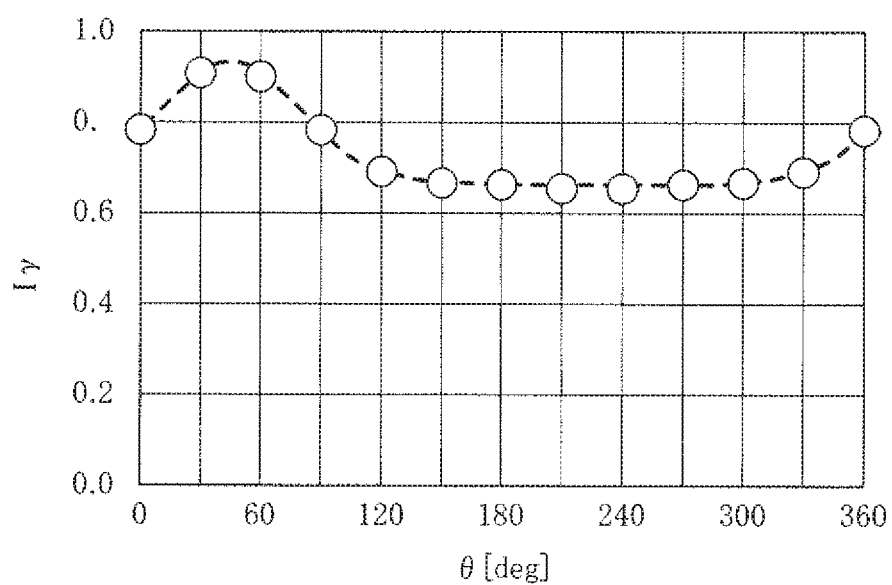
FIG. 7 is a diagram showing an example of the result of measurement of a current flowing through an armature in initial position estimation by using a full search.

FIG. 4 shows an example of the functional configuration of the motor controller 21. FIG. 5 shows an example of the configuration of a motor drive portion 26 and a current detector 27 of the motor controller 21. FIGS. 6A and 6B show an outline of the processing of initial position estimation by using a full search. FIG. 7 shows an example of the result of measurement of a current flowing through an armature in the initial position estimation by using a full search.

Referring to FIG. 4, the motor controller 21 includes a vector control unit 23, a speed/position estimating portion 24, an initial position estimating portion 25, the motor drive portion 26, and the current detector 27.

The motor drive portion 26 is an inverter circuit for supplying a current to the windings 33-35 of the brushless motor 3 to drive the rotor 32. Referring to FIG. 5, the motor drive portion 26 includes three dual elements 261, 262, and 263, and a pre-driver circuit 265.

Each of the dual elements 261-263 is a circuit component that packages therein two transistors having common characteristics (Field Effect Transistor: FET, for example) connected in series.

The dual elements 261-263 control a current I flowing from a DC power line 211 through the windings 33-35 to a ground line. To be specific, transistors Q1 and Q2 of the dual element 261 control a current Iu flowing through the winding 33. Transistors Q3 and Q4 of the dual element 262 control a current Iv flowing through the winding 34. Transistors Q5 and Q6 of the dual element 263 control a current Iw flowing through the winding 35.

Referring to FIG. 5, the pre-driver circuit 265 converts control signals U+, U−, V+, V−, W+, and W− fed from the vector control unit 23 to voltage levels suitable for the transistors Q1-Q6. The control signals U+, U−, V+, V−, W+, and W− that have been subjected to the conversion are given to control terminals (gates) of the transistors Q1-06.

The current detector 27 includes a U-phase current detector 271 and a V-phase current detector 272 to detect currents Iu and Iv flowing through the windings 33 and 34, respectively. Since the relationship of Iu+Iv+Iw=0 is satisfied, the current Iw can be obtained from the calculation of the values of the currents Iu and Iv detected.

The U-phase current detector 271 and the V-phase current detector 272 amplify a voltage drop by a shunt resistor provided in the current path of the currents Iu and Iv to perform A/D conversion on the resultant, and output the resultant as detection values of the currents Iu and Iv. In short, the U-phase current detector 271 and the V-phase current detector 272 make a two-shunt detection. The shunt resistor has a small resistance value of $\frac{1}{10}$ ω order.

The motor controller 21 may be configured by using a circuit component in which the motor drive portion 26 and the current detector 27 are integral with each other.

Referring back to FIG. 4, the vector control unit 23 controls the motor drive portion 26 in accordance with a speed command value ω* indicated in a speed command S1 given by a upper control unit 20. The upper control unit 20 is a controller to control an overall operation of the image forming apparatus 1. The upper control unit 20 gives the speed command S1 when: the image forming apparatus 1 warms up; the image forming apparatus 1 executes a print job; the image forming apparatus 1 turns into a power-saving mode; and so on. In giving a command to start driving the rotation, the upper control unit 20 sends the speed command S1 having a start command S1a to the vector control unit 23. In short, the speed command S1 serves as the start command S1a. Thereafter, the speed command value ω* is so increased for acceleration in accordance with a predetermined operation pattern. In response to the start command S1a entered, the vector control unit 23 controls the motor drive portion 26 to apply a pulse voltage to the windings 33-35 of the armature. The pulse voltage is used to estimate the initial position described later. Thereafter, the vector control unit 23 controls the motor drive portion 26 to generate a rotating magnetic field which rotates from the initial position estimated by the initial position estimating portion 25.

The vector control unit 23 includes a speed control unit; 41, a current control unit 42, an output coordinate transformation portion 43, a PWM conversion portion 44, and an input coordinate transformation portion 45. These individual portions perform processing for vector control of the brushless motor 3 in the following manner.

The speed control unit 41 determines current command values Iγ* and Iδ* of the γ-δ coordinate system based on the speed command value ω* fed from the upper control unit 20 and an estimated speed value ωm fed from the speed/position estimating portion 24 in such a manner that the estimated speed value ωm approaches the speed command value ω*.

The current control unit 42 determines voltage command values Vγ* and vδ* of the γ-δ coordinate system based on the current command values Iγ* and Iδ*.

The output coordinate transformation portion 43 transforms the voltage command values Vγ* and Vδ* to a ti-phase voltage command value Vu*, a V-phase voltage command value Vv*, and a W-phase voltage command value Vw* based on the estimated angle θm fed from the speed/position estimating portion 24.

The PWM conversion portion. 44 generates control signals U+, U−, V+, V−, W+, and W− based on the voltage command values Vu*, Vv*, and Vw* to output the control signals U+, U−, V+, V−, W+, and W− to the motor drive portion 26. The control signals U+, U−, V+, V−, W+, and W− are signals to control, by Pulse Width Modulation (PWM), the frequency and amplitude of the 3-phase alternating power to be supplied to the brushless motor 3.

The input coordinate transformation portion 45 uses the values of the U-phase current Iu and the V-phase current Iv detected by the current detector 27 to calculate a value of the W-phase current Iw. The input coordinate transformation portion 45 then calculates estimated current values Iγ and Iδ of the γ-δ coordinate system based on the estimated angle θm fed from the speed/position estimating portion 24 and the values of the 3-phase currents Iu, Iv, and Iw. In short, the input coordinate transformation portion 45 transforms the 3-phase currents to the 2-phase currents.

The speed/position estimating portion 24 determines the estimated speed value ωm and an estimated angle θm in accordance with a so-called voltage current equation based on the estimated current values Iγ and Iδ fed from the input coordinate transformation portion. 45 and the voltage command values Vγ* and Vδ* fed from the current control unit 42. The estimated speed value ωm is an example of an estimated value of the rotational speed of the rotor 32. The estimated angle θm is an example of an estimated value of the position of magnetic poles of the rotor 32.

The estimated speed value ωm thus determined is inputted to the speed control unit 41. The estimated angle θm thus determined is inputted to the output coordinate transformation portion 43 and the input coordinate transformation portion 45. The estimated speed value ωm may be sent to the upper control unit 20 as monitor information on rotating state.

The initial position estimating portion 25 uses the inductive sensing to estimate an initial position PSs (see FIG. 6) that is a position of magnetic pole PS of the rotor 32 which is in a stop state. The stop state is not limited to the state where the rotor 32 is in a completely stationary state. The following state may be regarded as the stop state a state where the rotor 32 is about to stop such as rotating at a low speed close to zero or vibrating slightly.

In what way the initial position PSs is estimated is as follows.

For the initial position estimation in this embodiment, a binary search technique is used in which a search target range is narrowed down in a step-by-step manner. As a comparative example of initial position estimation by using the binary search, first, the description goes on to processing of initial position estimation by using the full search in which no narrowing-down is performed.

As the processing of initial position estimation by using the full search, the speed control unit 41 controls, when the rotor 32 is in a stop state, the motor drive portion 26 to apply a pulse voltage Vθ, shown in FIG. 6B, many times. The pulse voltage Vθ is applied in order to generate a magnetic field vector 85 for searching as shown in FIG. 6A.

The direction of the magnetic field vector 85 is changed every time the pulse voltage Vθ is applied. In the example of FIG. 6A, the direction of the magnetic field vector 85 is changed to a direction shifted by 30° every time the pulse voltage Vθ is applied. The shifted angle 30° is obtained by dividing an angular position range (search target range) of an electrical angle of 360° equally into 12 sections. Stated differently, the pulse voltage Vθ is applied twelve times so that the magnetic field vector 85 is sequentially generated in all of the directions which are shifted by 30° from each other.

Hereinafter, applying the pulse voltage Vθ so that the direction of the magnetic field vector 85 is changed to estimate the initial position PSs is sometimes referred to as "search" or "searching".

In order to generate the magnetic field vector 85, a current vector 95 having the same direction as that of the magnetic field vector 85 is set. The current vector 95 represents a current to be passed through the windings 33-35 to generate the magnetic field vector 85. The magnitude of the current vector 95 is proportional to the magnitude of the magnetic field vector 85. For simplicity of drawing, in FIG. 6A, the magnetic field vector 85 and the current vector 95 are shown as the vectors having the same magnitude as each her.

Setting the current vector 95 is to set the direction and magnitude of the current vector 95 in the actual processing for controlling the motor drive portion 25. As the direction of the current vector 95, an angle θ is set which shows the angular position with respect to the U-phase winding 33. The angle θ shows the angular position of the d-axis as described above with reference to FIG. 3. In short, for estimation of the initial position PSs, the direction of the current vector 95 is set at the d-axis. Thus, the magnitude of the current vector 95 is equal to a d-axis component (Id) of the current vector 95. The current vector 95 has zero of the q-axis component (Iq).

Referring to FIG. 4, as the processing for search, the speed control unit 41 conveys the current command values Id* and Tq* to the current control unit 42, and conveys the angle θ to the output coordinate transformation portion 43. The current command value Id* indicates a value Id of the d-axis component of the current vector 95. The current command value Id* is constant through the twelve times of application of the pulse voltage Vθ. The current command value Iq* is zero. The angle θ is increased every application of the pulse voltage Vθ from zero to 330° (11π/6) by 30° (π/6) for example.

The current control unit 42 determines the voltage command values Vγ* and Vδ* based on the current command values Id* and Iq* instead of the current command values Iγ* and Iδ*. To be specific, in the processing for initial position estimation, the current command value Iq* is zero and the voltage command value Vγ* is determined in response to the current command value Id*. The voltage command value Vδ* is zero. In such a case, it can be said that the voltage command value Vγ* is a voltage command value Vd* for determining the voltage value (magnitude) Vd of the pulse voltage Vθ.

Another arrangement is possible in which the current control unit 42 outputs the voltage command value Vd* directly to set the voltage value Vd without using the current command value Id*.

The output coordinate transformation portion 43 converts the voltage command values Vγ* and Vδ* to the voltage command values Vu*, Vv*, and Vw* based on the angle θ instead of the estimated angle θm. The PWM conversion portion 44 generates control signals U+, U−, V+, V−, W+, and W− based on the voltage command values Vu*, Vv*, and Vw*. The motor drive portion 26 applies the pulse voltage Vθ to the brushless motor 3 in accordance with the control signals U+, U−, V+, V−, W+, and W−.

Each of the pulse voltages Vθ shown in FIG. 6B has a single rectangular waveform. However, a waveform of a voltage actually applied to the brushless motor 3 has a plurality of rectangular waveforms which have been subjected to pulse width modulation at a cycle of 10 kHz-20 kHz clock for each of the U-phase, V-phase, and W-phase.

Referring to FIG. 6B, the estimated current value Iγ flowing through the windings 33-35 is increased in association with the application of the pulse voltages Vθ and is decreased in association with the end of the application of the pulse voltages Vθ. The increase and decrease are exponential changes. Each of the pulse voltages Vθ is applied at a time when the estimated current value Iγ increased by the application of the immediately before pulse voltage Vθ is decreased to a level corresponding to the level before the increase. The cycle H of the application of the pulse voltage Vθ is approximately 200 ms, for example.

The initial position estimating portion 25 obtains, from the input coordinate transformation portion 45, the estimated current values Iγ and Iδ at a time when a time T0 shorter than the pulse width of the pulse voltage Vθ has passed since the rising edge of each of the pulse voltages Vθ. Where the pulse voltage Vθ is applied twelve times, the twelve estimated current values Iγ are obtained in order. The estimated current values Iγ and Iδ are examples of the current flowing through the windings 33-35 of the stator 31 as the armature.

In the example of FIG. 6A, the initial angle θs which is an angle corresponding to the initial position. PSs is approximately 43°. Accordingly, in FIG. 7, the estimated current value Iγ for the case where an angle θ for search is 30° or 60° close to the initial angle θs is greater than the estimated current value Iγ for the other cases, in particular, the estimated current value Iγ for the case where the angle θ for search is 210° or 240° close to the position opposite to the initial position PSs.

The initial position estimating portion 25 estimates that an angle θ corresponding to the largest estimated current value Iγ of the twelve estimated current values Iγ obtained is the initial angle θs. The initial position estimating portion 25 then conveys the initial angle θs thus estimated to the speed control unit 41 as a result of the estimation of the initial position PSs. In such a case, a range of error between the estimated initial angle θs and a true position of magnetic pole PS is ±15°. In short, the full search by 30° each enables the initial position PSs to be estimated at an accuracy of ±15°.

When the rotation of the rotor 32 starts, the speed control unit 41 inputs the initial angle θs thus received to the output coordinate transformation portion. 43 as an initial value of the estimated angle θm. Thereby, the motor drive portion 26 is controlled to start the rotor 32 to rotate from the initial position PSs estimated.

As a variation of the estimation of the initial angle θs, the following arrangement is also possible. To be specific, of the twelve estimated current values Iγ, a predetermined number (at least two) of the estimated current values Iγ in decreasing order of value are extracted, and an interpolation operation based on the predetermined number of estimated current; values Iγ is performed to calculate, as the initial angle θs, an angle θ at which the estimated current value Iγ is largest.

Meanwhile, in this embodiment, the binary search technique is used to shorten the time required for the initial position estimation.

Figure 9A:
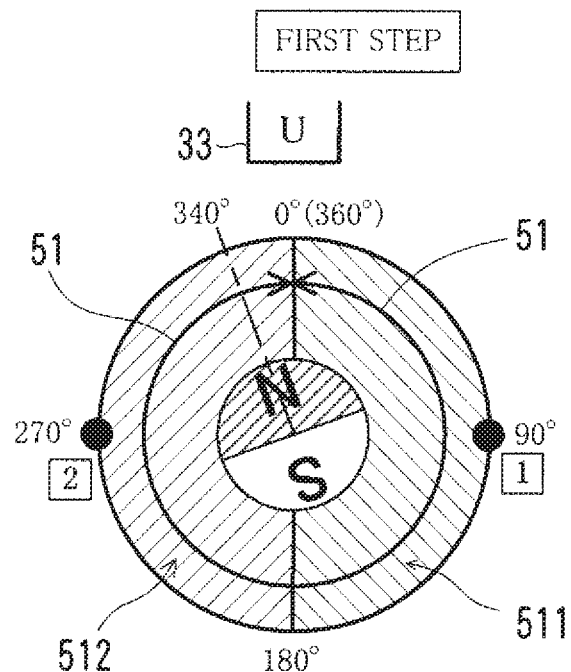
FIGS. 9(A) and 9(B) are diagrams showing an example of a case where a search is possible based on a default division of a target range.
Figure 9B:
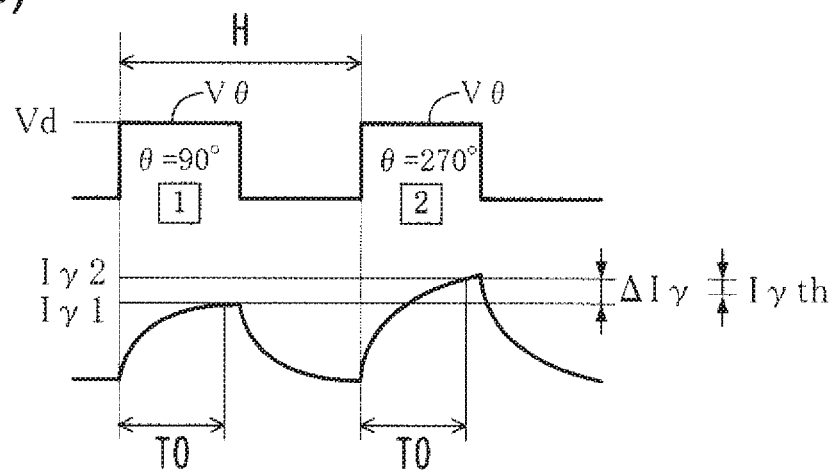
Figure 11A:
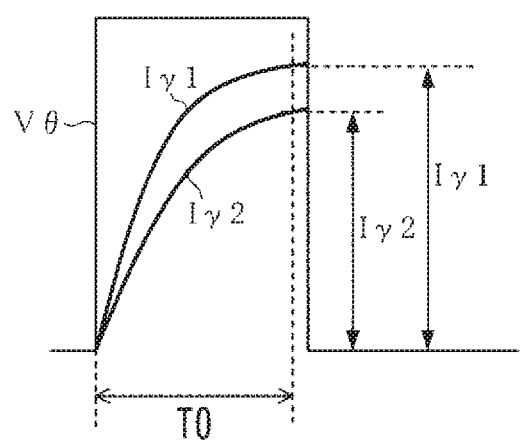
FIGS. 11A and 11B are diagrams showing examples of current quantification at application of a pulse voltage.
Figure 11B:
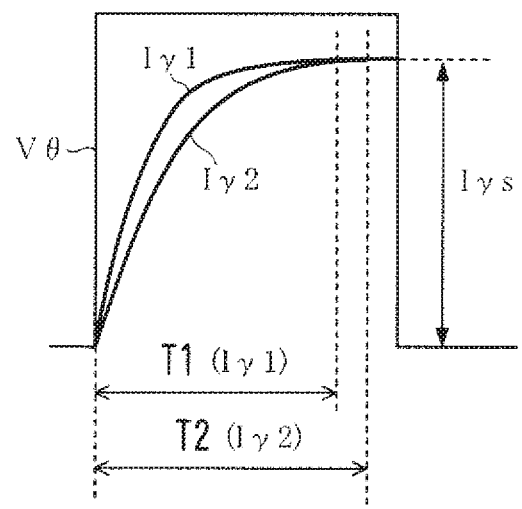

FIGS. 8(A)-8(D) show an outline of a first example of the initial position estimation by using the binary search. FIGS. 9(A)-9(B) show an example of a case where a search is possible based on a default division of a target range 51. FIGS. 10(A)-10(C) show an example of a change in angular position of the target range 51 for the case where a search is impossible. FIGS. 11A and 11B show examples of quantification of the currents Iγ1 and Iγ2 at application of the pulse voltage Vθ. FIG. 12 shows an example of tables 81 and 81*b* in which to set a direction of the magnetic field vector 85.

The boxed numbers in FIGS. 6-10 show the order in which the magnetic field vector 85 is generated in each step. Referring to FIG. 8, the direction of magnetic pole is set at 340°, which is merely an example.

As shown in FIG. 8, the initial position estimation has four steps. In each of the steps, the speed control unit 41 controls the motor drive portion 25 to apply the pulse voltage Vθ for generating the magnetic field vector 85 for searching for the initial position PSs. At this time, as the processing for narrowing down the target range 51 for the binary search in a step-by-step manner, the initial position estimating portion 25 changes the direction of the magnetic field vector 85 so that the magnetic field vectors 85 are generated in order in each of the two search sections obtained by dividing the target range. Changing the direction of the magnetic field vector 85 is to change the angle θ as described above. The initial position estimating portion 25 informs the speed control unit 41 of the angle θ and makes a request for application of the pulse voltage Vθ.

In this embodiment, an allowable angle is selected at, for example, "22.5°". The value is so selected that the initial angle θs can be estimated at accuracy equal to or higher than that of the foregoing estimation by using the full search in increments of 30°.

In the first step, the target range 51 is the range from 0° to 360° by an electrical angle. Since the number of magnetic poles of the brushless motor 3 is 2 in this embodiment, the electrical angle and the mechanical angle are equal to each other. In short, the target range 51 is an angular position range corresponding to one revolution of the rotor 32.

The default (initial settings) division of the target range 51 is to divide, by 180° each, the target range 51 from the position corresponding to 0°. In short, the target range 51 is divided into a search section 511 corresponding to 0° through 180° and a search section 512 corresponding to 180° through 360°.

As shown in FIG. 9(B), the speed control unit 41 controls the motor drive portion 26 to apply the pulse voltage Vθ twice. In the first application, in order to generate the magnetic field vector 65 in the search section 511 for example, 90° which is an angle in the middle of the search section 511 is set as the angle θ. In the second application, in order to generate the magnetic field vector 85 in the search section 512, 270° which is an angle in the middle of the search section 512 is set as the angle θ. The pulse voltages Vθ may be applied in the reverse order.

The initial position estimating portion 25 measures the current flowing through the windings 33-35 every time the pulse voltage Vθ is applied. The current quantification has two examples as shown in FIGS. 11A and 11B. In the example of FIG. 11A, the estimated current values Iγ (Iγ1 and Iγ2) at a point in time when a time T0 has elapsed since the rising edge of each of the pulse voltages Vθ are obtained, in the example of FIG. 11B, times T1 and T2 necessary for the estimated current value Iγ to be increased to the set value Iγs since the rising edge of each of the pulse voltages Vθ are counted. In any case, the initial position estimating portion 25 measures a current at a time synchronously with a measurement command S5 (see FIG. 4) inputted from the speed control unit 41 appropriately.

Referring to FIG. 9(B), a difference ΔIγ between the estimated current value Iγ1 for the first time and the estimated current value Iγ2 for the second time is greater than a threshold Iγth. In such a case, the initial position estimating portion 25 selects, as a new target range 52, a search section corresponding to a larger one of the estimated current values Iγ1 and Iγ2, namely, a search section through which the largest current flows. In the example of FIGS. 9(A) and 9(B), the search section 512 in which the magnetic field vector 85 is generated in the second application is selected. The processing for initial position estimation then goes to the second step.

In the meantime, the difference $\Delta I\gamma$ between the estimated current values $I\gamma 1$ and $I\gamma 2$ is sometimes smaller than the threshold $I\gamma$th. Such a case is, for example, as shown in FIG. 10(A), a case where the direction of magnetic pole is close to the direction of the boundary between the search sections 511 and 512.

In such a case, the initial position estimating portion 25 changes the current target range 51 to a range where the angular position thereof is shifted. The initial position estimating portion 25 then informs the speed control unit 41 of the angle θ in such a manner that the magnetic field vector 85 is generated in order in two search sections 511b and 512b obtained by dividing the post-change target range 51b. The angle of the target range 51 to be shifted is preferably an angle corresponding to a half of the target range 51. Since the target range 51 in the first step is 180° (π), the angle to be shifted is preferably 90° (π/2). The angle to be shifted may be set at an angle smaller than 90°, for example, 45° through 90°.

As for the post-change target range 51b, the initial position estimating portion 25 performs again the processing similar to that for the pre-change default target range 51b before the change.

Referring, back to FIGS. 8(A)-8(D), in the second step, the target range 52 is a range from 180° through 360° which corresponds to a half of the target range 51 in the first step obtained by narrowing down the target range 51. The target range 52 is divided into search sections each having 90°, namely, a search section 521 ranging from 180° through 270° and a search section 522 ranging from 270° through 360°.

The speed control unit 41 controls the motor drive portion 26 to apply the pulse voltage Vθ twice in the second step. In the first application, for example, 315° which is an angle in the middle of the search section 522 is set at the angle θ. In the second application, 225° which is an angle in the middle of the remaining search section 521 is set at the angle θ.

In the example of FIG. 8(B), the search section 522 is made as a target range 53 in the third step because the current flowing in the first application is greater than the current flowing in the second application.

The target range 53 in the third step is divided into sections each having 45°, namely, a search section 531 ranging from 270° through 315° and a search section 532 ranging from 315° through 360°.

The speed control unit 41 controls the motor drive portion 26 to apply the pulse voltage Vθ twice in the third step. In the first application, for example, 337.5° which is an angle in the middle of the search section 532 is set at the angle θ. In the second application, 292.5° which is an angle in the middle of the remaining search section 531 is set at the angle θ.

In the example of FIG. 8(C), the search section 532 is made as a target range 54 in the fourth step because the current flowing in the first application is greater than the current flowing in the second application.

The target range 54 in the fourth step is a final target range which has been narrowed down to a predetermined size. Stated differently, the binary search is performed on the target range 54, so that a result of estimation with desired accuracy that an error of estimation for the initial position PSs falls within a permissible range in the specifications can be obtained.

The target range 54 in the fourth step is divided into sections each having 22.5°, namely a search section 541 ranging from 315° through 337.5° and a search section 542 ranging from 337.5° through 360°. In the fourth step, the speed control unit 41 controls the motor drive portion 26 to apply the pulse voltage Vθ twice. In the first application, 348.75° which is an angle in the middle of the search section 542 is set at the angle θ. In the second application, 326.25° which is an angle in the middle of the remaining search section 541 is set at the angle θ.

In the fourth step in which the target range 54 is narrowed down, the initial position estimating portion 25 estimates the initial position PSs based on a current flowing through the armature at a time when the pulse voltage vθ is applied so that the magnetic field vector 85 is generated in each of the search sections 541 and 542. To be specific, the initial position estimating portion 25 estimates that the initial position PSs is a position in the middle of a search section corresponding to a larger one of the estimated current values $I\gamma 1$ and $I\gamma 2$ in the second application, for example, the search section 542. The initial position estimating portion 25 then informs the speed control unit 41 of an angle of the initial position PSs thus estimated, 348.75° for example, as the initial angle θs.

In the initial position estimation by using the binary search, the angle θ set by the initial position estimating portion 25 may be stored in a non-volatile memory in advance, such as the angle setting information 80 shown in FIG. 12. The angle setting information 50 includes a table 81 indicating the target ranges in the individual steps and default values of the angle θ and a table 81b indicating a value of the angle θ for the case where the target range is shifted as described earlier with reference to FIG. 10.

Figure 13A:
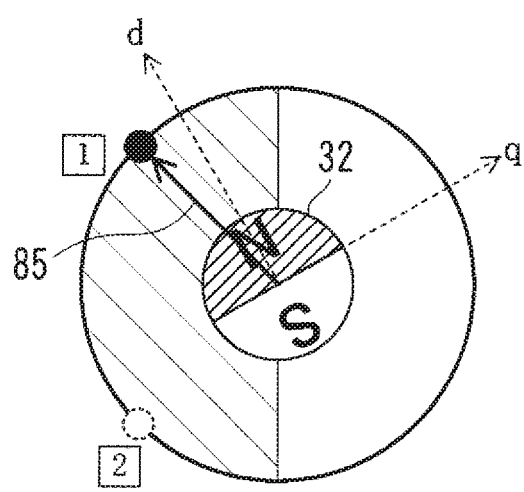
FIGS. 13A and 13B are diagrams showing examples of the positional relationship between a magnetic field vector and a rotor in a binary search.
Figure 13B:
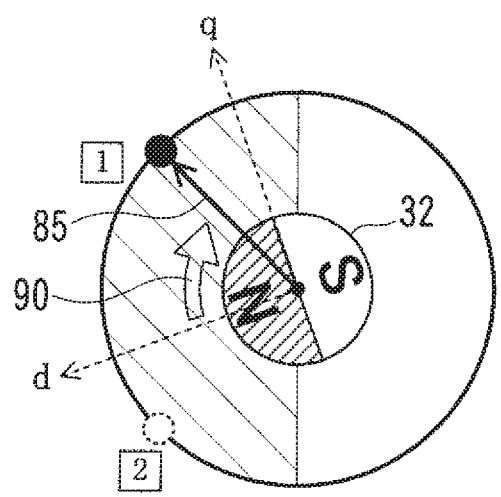

FIGS. 13A and 13B show examples of the positional relationship between the magnetic field vector 85 and the rotor 32 in the binary search. In the binary search, the rotor 32 possibly rotates depending on the direction of magnetic pole at a time when the magnetic field vector 85 is generated. In particular, the rotor 32 tends to rotate: when the rotor 32 has small inertia; when a load placed on the brushless motor 3 is small; when the temperature of the windings 33-35 is low; or when these situations are combined with each other. Since the electric resistance is small at a low temperature, a current greater than that at a high temperature flows through the windings 33-35, and the magnetic field vector 85 is increased. The rotation of the rotor 32 makes it impossible to obtain a correct search result.

Referring to FIG. 13A, the direction of magnetic pole, namely, the d-axis, of the actual rotor 32 for the case where the magnetic field vector 85 is generated is close to the direction of the magnetic field vector 85. In such a case, the q-axis component of the magnetic field vector 85 is smaller than the d-axis component thereof. The rotor 32 is thus difficult to rotate due to the inertial resistance and the sliding resistance.

In contrast, referring to FIG. 13B, the direction of magnetic pole of the rotor 32 is largely different from the direction of the magnetic field vector 85. In other words, the direction of the magnetic field vector 85 is closer to the q-axis than to the d-axis. In such a case, since the q-axis component of the magnetic field vector 85 is larger than the d-axis component thereof, a torque 80 causing the rotation of the rotor 32 is sometimes developed.

To cope with this, in a second example of the initial position estimation described below, the vector control unit 23 controls the motor drive portion 26 to apply the pulse voltage Vθ so that, in narrowing down the target range, the magnetic field vector 86 for preventing rotation is generated in a non-target range.

Figure 15:
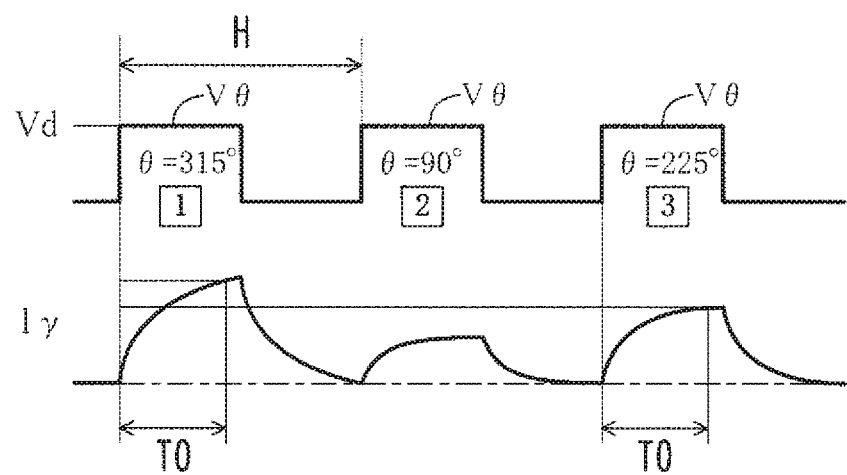
FIG. 15 is a diagram showing an example of a time of application of a pulse voltage and a time of measurement of a current.

FIGS. 14(A)-14(D) show an outline of the second example of the initial position estimation by using the binary search. FIG. 15 shows an example of a time of application of the pulse voltage Vθ and a time of measurement of the current Iγ. FIG. 16 shows an example of tables 82 and 82*b* in which to set the direction of the magnetic field vectors 85 and 86. The boxed numbers in FIG. 14 show the order in which the magnetic field vectors 85 and 86 are generated in each step. The direction of magnetic pole is set at 340° in FIG. 14, which is merely an example.

As shown in FIG. 14, the second example of the initial position estimation has four steps, as with the foregoing first example. The basic processing of the second example is similar to that of the first example. The second example is characterized in that the pulse voltage VU is applied in the second step and the third step to generate the magnetic field vector 86 for preventing rotation.

In the first step, the target range 51 is the range from 0° to 360° by an electrical angle. The target range 51 is divided into a search section 511 corresponding to 0° through 180° and a search section 512 corresponding to 180° through 360°.

The speed control unit 41 controls the motor drive portion 26 to apply the pulse voltage Vθ twice. In the first application, 90° which is an angle in the middle of the search section 511 is set as the angle θ. In the second application, 270° is set as the angle θ.

The initial position estimating portion 25 measures the current flowing through the windings 33-33 every time the pulse voltage Vθ is applied. The current quantification is described earlier with reference to FIGS. 11A and 11*b*. In this example, the initial position estimating portion 25 selects the search section 512 as a new target range 52 because the estimated current value Iγ2 in the second application is larger than the estimated current value Iγ1 in the first application.

As with the example of FIGS. 10(A)-10(D), where the difference ΔIγ between the estimated current values Iγ1 and Iγ2 is smaller than the threshold Iγth, search in the first step is made again with the angular position of the target range 51 shifted.

In the second step, the target range 52 is a range from 180° through 360° which corresponds to a half of the target range 51 in the first step obtained by narrowing down the target range 51. The target range 52 is divided into sections each having 90°, namely, a search section 521 ranging from 180° through 270° and a search section 522 ranging from 270° through 360°.

The speed control unit. 41 controls the motor drive portion 26 to apply the pulse voltage Vθ three times in the second step as shown in FIG. 15. In the first application, for example, 315° which is an angle in the middle of the search section 522 is set at the angle θ. In the second application, the angle θ is set at, for example, 90° in order to generate the magnetic field vector 86 for preventing rotation in a non-target region 62. In the third application, for example, 225° which is an angle in the middle of the remaining search section 521 is set at the angle θ.

What is important herein is the order in which the magnetic field vectors 85 and 86 are generated. To be specific, the magnetic field vector 86 for preventing rotation is generated in the non-target region 62 while the magnetic field vector 85 for searching (see FIGS. 6A and 6B) is being generated in the two search sections 522 and 521.

The magnetic field vector 86 for preventing rotation is generated in this way, so that, even if a torque 90 is produced by the magnetic field vector 85 for searching in the search section 522 and the rotor 32 attempts to rotate, a torque in the opposite direction by the magnetic field vector 86 suppresses the rotation of the rotor 32. Alternatively, even if a torque is produced by the magnetic field vector 86 and the rotor 32 attempts to rotate, the magnetic field vector 85 to be generated next in the search section 521 suppresses the rotation of the rotor 32. The three magnetic field vectors 85, 85, and 86 having a high speed spaced away from each other do not produce a torque in the rotor 32. It is noted that 90° which is a set value of the angle θ corresponding to the magnetic field vector 86 is an angle shifted, by an electrical angle of 180°, with respect to an angular position (270°) in the middle of the target range 52.

As compared to the case where the rotor 32 rotates between the first application of the pulse voltage Vθ and the second application of the pulse voltage Vθ, the rotation of the rotor 32 after the second application does not make a large influence. Even if the rotor 32 rotates more or less, searching can be conducted as long as the position of magnetic pole PS does not deviate from the target range 53 for search in the next step. Thus, in order to securely prevent the rotation due to the first application, it is possible to set the direction of the magnetic field vector 86 at a direction shifted, by an electrical angle of 180°, with respect to the direction of the magnetic field vector 85 generated in the first application, or, at a direction close to the direction.

The target: range 53 in the third step is divided into sections each having 45°, namely, a search, section 531 ranging from 270° through 315° and a search section 532 ranging from 315° through 360°.

In the third step also, the speed control unit 41 controls the motor drive portion 26 to apply the pulse voltage Vθ three times. In the first application, for example, 337.5° which is an angle in the middle of the search section 532 is set at the angle θ. In the second application, the angle θ is set at, for example, 135° in order to generate the magnetic field vector 86 for preventing rotation in a non-target region 63. The value is an angle shifted, by an electrical angle of 180°, with respect to the angular position (315°) in the middle of the target range 53. In the third application, 292.5° which is an angle in the middle of the remaining search section 531 is set at the angle θ.

The magnetic field vector 86 is generated in this way, which prevents the rotor 32 from rotating, as with the second step.

The target range 54 in the fourth step is a final target range which has been narrowed down to a predetermined size. The target range 54 is divided into sections each having 22.5° namely, a search section 541 ranging from 315° through 337.5° and a search section 542 ranging from 337.5° through 360°.

In the fourth step, the speed control unit 41 controls the motor drive portion 26 to apply the pulse voltage Vθ twice. In the first application, for example, 348.75° which is an angle in the middle of the search section 542 is set at the angle θ. In the second application, 326.25° which is an angle in the middle of the remaining search section 541 is set at the angle θ.

Stated differently, no magnetic field vector 85 for preventing rotation is generated in the fourth step. This is because, even if the direction of the magnetic field vector 85 and the direction of magnetic pole are shifted from each other, the shift is so small that the torque 90 is not produced because of the small target range 54. However, it is possible to generate the magnetic field vector 86 in the fourth step.

In the second example of the initial position estimation by using the foregoing binary search, the angle θ set by the speed control unit 41 is set based on the tables 82 and 82*b* stored as the angle setting information 60 shown in FIG. 15 in the non-volatile memory. The table 82 indicates the target ranges in each step and the default values of the angle θ. The table 81*b* indicates values of the angle θ for the case where the target range is shifted as described earlier with reference to FIG. 10.

Figure 17:
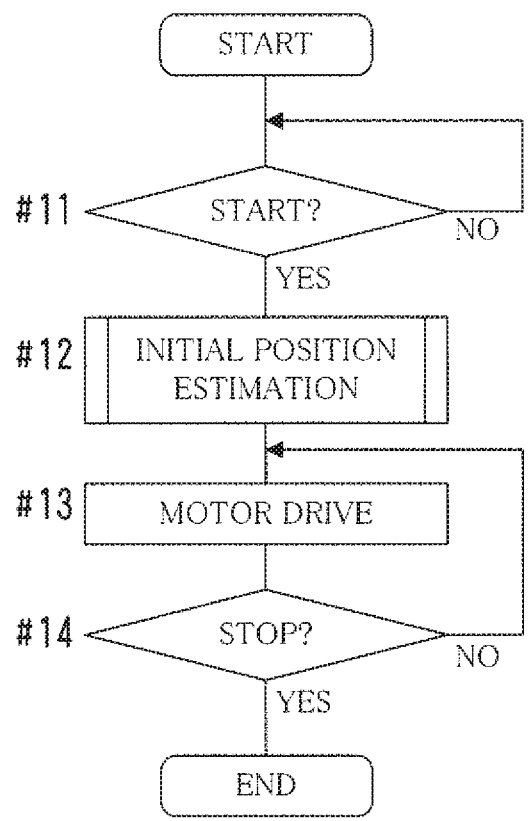
FIG. 17 is a diagram showing an outline of the flow of processing in a motor controller.
Figure 18:
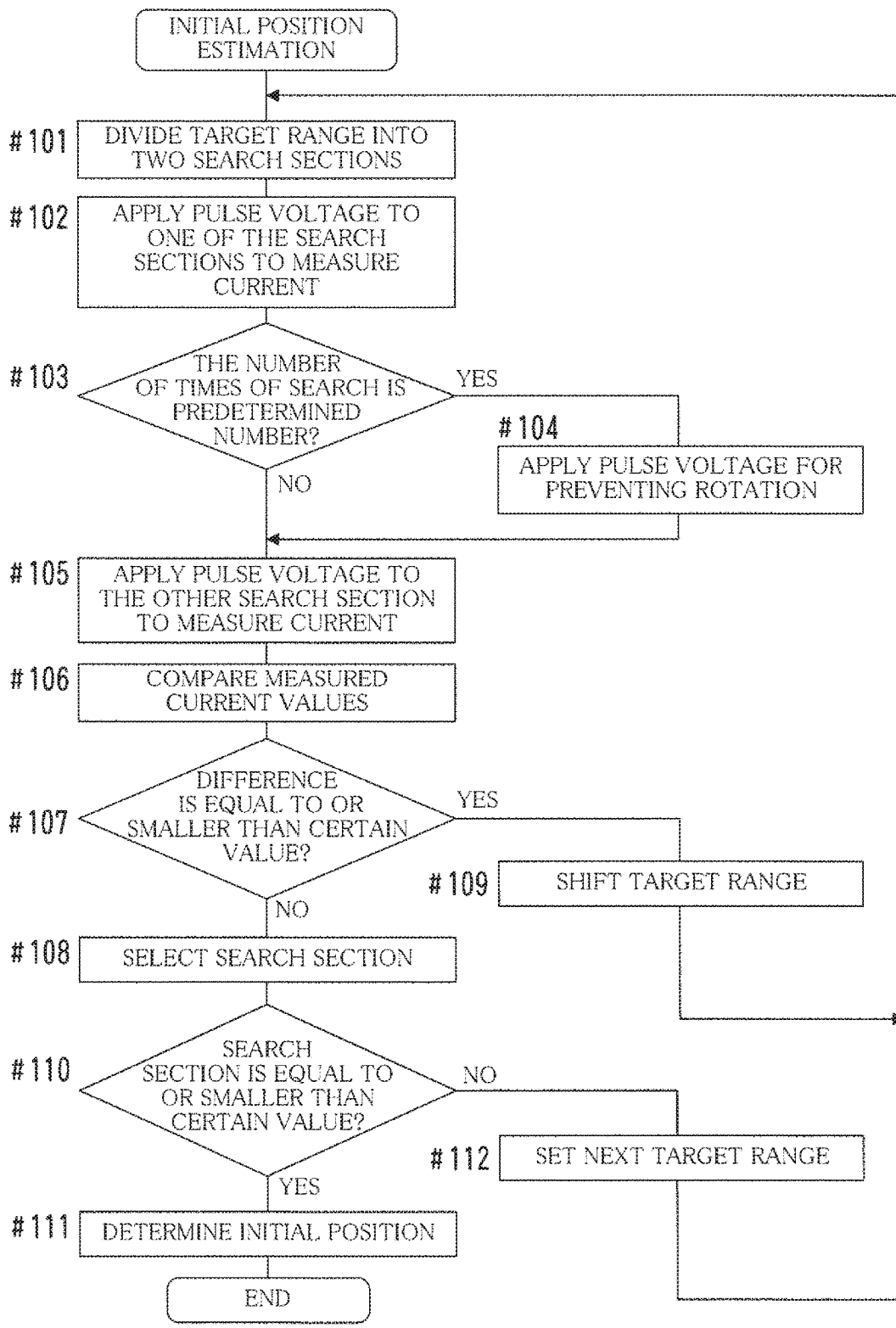
FIG. 18 is a diagram showing an example of the flow of initial position estimation processing.

FIG. 17 shows an outline of the flow of processing in the motor controller 21, FIG. 18 shows an example of the flow of the initial position estimation processing.

Referring to FIG. 17, the motor controller 21 waits for the upper control unit 20 to give the start command S1*a* (Step #11). When the start command S1*a* is given (YES in Step #11), the motor controller 21 performs the initial position estimation processing (Step #12) to control the motor drive for rotating the brushless motor 3 (Step #13). The motor controller 21 keeps controlling the motor drive before the upper control unit 20 gives a stop command (Step #14).

Referring to FIG. 18, the motor controller 21 divides the target ranges 51-53 in the current step into two search sections (Step #101). The motor controller 21 applies the pulse voltage Vθ to generate the magnetic field vector 85 for searching in one of the two search sections, and then makes measurements of the current Iγ (Step #102).

The motor controller 21 checks whether or not the number of times of search is a predetermined number (2 or 3, for example), namely, whether or not the current step is a step in which it is necessary to generate the magnetic field vector 86 for preventing rotation in the current step (Step #103).

If the number of times of search is the predetermined number (YES in Step #103), then the motor controller 21 sets an angle θ to generate the magnetic field vector 86 for preventing rotation and applies the pulse voltage Vθ (Step #104). Thereafter, the processing goes to Step #105. If the number of times of search is not the predetermined number (NO in Step #103), then the processing goes to Step #105 immediately.

In Step #105, the motor controller 21 applies the pulse voltage Vθ to generate the magnetic field vector 85 in the other search section, and then makes a measurement of the current Iγ.

The motor controller 21 compares the measurement values (estimated current values Iγ1 and Iγ2) of the current Iγ in each of the twice applications (Step #106).

If the difference ΔIγ between the estimated current values Iγ1 and Iγ2 is equal to or smaller than the threshold Iγth (YES in Step #107), then the motor controller 21 shifts the target range by a predetermined angle. For example, the target range is shifted by 90° when the current step is the first step. In the second through fourth steps, the target range is shifted by an angle corresponding to a half of the target ranges 52-54 or smaller than the half thereof.

If the difference ΔIγ between the estimated current values Iγ1 and Iγ2 is not equal to or smaller than the threshold Iγth (NO in Step #107), then the motor controller 21 selects, as a hit section, a search section corresponding to a larger value of the estimated current values Iγ1 and Iγ2 (Step #106).

If the selected search section does not have a size equal to or smaller than a predetermined value (NO in Step #110), then the motor controller 21 sets the search section selected as the next target range (Step #112), and the processing goes back to Step #101 to continue the narrowing down.

If the selected search section has a size equal to or smaller than the predetermined value (YES in Step #110), then the motor controller 22 determines that an angular position in the middle of the search section selected is the initial position PSs (Step #111). It is also possible to calculate, as the initial position PSs, a position between the centers of the two search sections by performing an interpolation operation based on the two estimated current values Iγ1 and Iγ2 measured.

FIG. 19 shows an example of the relationship between a division number of the target ranges 51 and the number of application times of the pulse voltage Vθ.

As described above, in the initial position estimation by using the binary search shown in FIG. 8 or FIG. 14, the final target range 54 after the narrowing-down has a range of 45°. It is estimated that the initial position PSs is an angular position in the middle of any of the search sections 541 and 542 each having a range of 22.5° corresponding to a half of the final target range 54. The accuracy of such estimation is equal to the accuracy of estimation by using the full search in which the division number N is 16 by division of 360° by 22.5° each.

In the initial position estimation by using the full search in which the division number N is 16, the total number of applications of the pulse voltage Vθ (the number of pulses) M is "16". In contrast, in the initial position estimation by using the binary search shown in FIG. 8 (first example: no rotation, prevention), the number of pulses M is "8", which is a half of that in the full search. In other words, it is possible to reduce the time required for the initial position estimation to a half of that in the initial position estimation by using the full search.

In the initial position estimation by using the binary search shown in FIG. 14 (second example: rotation prevention applied), the number of pulses M is "11", provided that the magnetic field vector 86 for preventing rotation is generated in three steps other than the first step. In other words, it is possible to estimate the initial position PSs for a time shorter than that in the initial position estimation by using the full search.

As shown in FIG. 19, as the division number N is larger, in other words, as the accuracy of estimation is increased, a difference between the case by using the full search and the case by using the binary search becomes larger. This improves the effect of speed-up of estimation by using the binary search technique.

Referring to FIG. 19, as indicated by using the Landau symbol ("O": omicron), the order of the number of pulses M for the initial position estimation by using the binary search is log 2N for both the cases of no rotation prevention and rotation prevention. In light of the above, even when the pulse voltage Vθ for rotation prevention is applied, it is possible to estimate the initial position PSs for a time having the same order as that in the case where such application, is not performed.

In the foregoing embodiment, it is possible to estimate, at a predetermined degree of accuracy, the initial position PSs that is the position of magnetic pole PS of the rotor 32 in the stop state, and also possible to shorten the time necessary for estimation as compared to the conventional techniques.

Since the magnetic field vector 86 for preventing rotation is generated in the non-target regions 62 and 63 for the binary search, it is possible to prevent the rotor 32 from rotating during a period of the binary search on the target ranges 52 and 53. This reduces the occurrence of a situation where the initial position PSs cannot be estimated.

In the foregoing embodiment, the number of steps in the initial position estimation may be 5 or more, which increases the accuracy of estimation. The number of steps is preferably determined depending on the accuracy required. Even when no problem arises in driving the rotation of the brushless motor 3 with the number of steps being 4, the number of steps may be 5 or more to obtain a higher degree of accuracy substantially.

In the foregoing embodiment, another arrangement is possible in which the magnetic field vector 86 for preventing rotation is generated when the rotor 32 of the brushless motor 3 is easy to rotate, such as when the windings 33-35 have a low temperature; and no magnetic field vector 86 is generated when the rotor 32 is hard to rotate.

In the foregoing embodiment, the structure of the tables 81, 81*b*, 82, and 82*b* and the data values therein are examples, and the other structures or the other data values may be used.

The application time (pulse width) of the pulse voltage ye to be applied for rotation prevention may be the same as the pulse width of the pulse voltage Vθ to be applied to generate the magnetic field vector 85 for searching. Alternatively, the former pulse width may be shorter or longer than the latter pulse width.

In each step of the first through fourth steps, the target ranges 51, 52, 53, and 54 may be divided into three search sections or more. In short, the n-division search may be performed.

It is to be understood that the overall configuration of the image forming apparatus 1 and the motor controller 21, the constituent elements thereof, the content of the processing, the order of the processing, the time of the processing, the structure of the brushless motors 3 and 3*b*, and the like may be appropriately modified without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A controller for a sensorless permanent magnet synchronous motor having a rotor using a permanent magnet, the rotor rotating by a rotating magnetic field caused by a current flowing through an armature, the controller comprising:
    a drive portion configured to apply a voltage to the armature to drive the rotor;
    an initial position estimating portion configured to estimate an initial position which is a position of magnetic poles of the rotor which is in a stop state; and
    a control unit configured to control the drive portion; wherein
    the initial position estimating portion gives instructions to the control unit to apply a pulse voltage for generating a magnetic field vector for searching for the initial position to each of search sections obtained by dividing a target range narrows down a target range in such a manner that a search section in which a largest amount of current flows through the armature by application of the pulse voltage is selected as a subsequent target range, and estimates the initial position.

2. The controller for the sensorless permanent magnet synchronous motor according to claim 1, wherein the initial position estimating portion gives instructions to the control unit to apply a pulse voltage so that, in narrowing down the target range, a magnetic field vector for preventing rotation is generated in a non-target range which is not the target range.

3. The controller for the sensorless permanent magnet synchronous motor according to claim 2, wherein the initial position estimating portion gives instructions to the control unit to generate the magnetic field vector for preventing rotation while the magnetic field vector for searching is generated in each of the search sections in order.

4. The controller for the sensorless permanent magnet synchronous motor according to claim 2, wherein a direction of the magnetic field vector for preventing rotation is a direction shifted, by an electrical angle of 180°, with respect to a direction of the magnetic field vector for searching generated in the search section, or, is a direction close to the direction.

5. The controller for the sensorless permanent magnet synchronous motor according to claim 2, wherein a direction of the magnetic field vector for preventing rotation is a direction shifted, by an electrical angle of 180°, with respect to an angular position in a middle of the target range.

6. The controller for the sensorless permanent magnet synchronous motor according to claim 1, wherein the initial position estimating portion gives instructions to the control unit to generate a magnetic field vector for preventing rotation only in a step before the target range is narrowed down to a set size.

7. The controller for the sensorless permanent magnet synchronous motor according to claim 1, wherein, when a difference between the currents of the search sections where the magnetic field vector for searching is generated in each of the search sections is equal to or smaller than a threshold, the initial position estimating portion gives instructions to the control unit to change the current target range to a range where an angular position of the current target range is shifted, and to generate the magnetic field vector for searching in each of search sections obtained by dividing a post-change target range.

8. The controller for the sensorless permanent magnet synchronous motor according to claim 1, wherein the initial position estimating portion estimates the initial position based on a value of the current at a point in time when a set time equal to or shorter than an application time of the pulse voltage has elapsed since a rising edge of the pulse voltage.

9. The controller for the sensorless permanent magnet synchronous motor according to claim 1, wherein the initial position estimating portion estimates the initial position based on a time from a rising edge of the pulse voltage to a reach to a set value of a value of the current.

10. A control method for estimating an initial position of a rotor in a sensorless permanent magnet synchronous motor, the control method comprising:
    estimating an initial position by repeatedly performing processing for applying a pulse voltage for generating a magnetic field vector for searching for the initial position to each of search sections obtained by dividing a target range which is an angular position range to be searched in an armature and processing for narrowing down a target range in such a manner that a search section in which a largest amount of current flows through the armature by application of the pulse voltage is selected as a subsequent target range.

11. The control method for estimating the initial position according to claim 10, wherein, in narrowing down the target range, a pulse voltage is applied so that a magnetic field vector for preventing rotation is generated in a non-target range which is not the target range.

* * * * *